(12) United States Patent
Luo et al.

(10) Patent No.: US 10,965,095 B2
(45) Date of Patent: Mar. 30, 2021

(54) OPTICAL AMPLIFICATION SYSTEM

(71) Applicant: Huawei Technologies Co., Ltd., Shenzhen (CN)

(72) Inventors: Xiaodong Luo, Shenzhen (CN); Shaofeng Qiu, Shenzhen (CN); Bo Wu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/786,644

(22) Filed: Feb. 10, 2020

(65) Prior Publication Data

US 2020/0194961 A1 Jun. 18, 2020

Related U.S. Application Data

(63) Continuation of application No. PCT/CN2017/096743, filed on Aug. 10, 2017.

(51) Int. Cl.
*H04B 10/02* (2006.01)
*H01S 3/23* (2006.01)
*H01S 3/067* (2006.01)
*H01S 3/094* (2006.01)
*H01S 3/16* (2006.01)
*H04J 14/02* (2006.01)

(52) U.S. Cl.
CPC .......... *H01S 3/2316* (2013.01); *H01S 3/0677* (2013.01); *H01S 3/06766* (2013.01); *H01S 3/094003* (2013.01); *H01S 3/1608* (2013.01); *H04J 14/02* (2013.01)

(58) Field of Classification Search
CPC .... H04J 14/02; H04J 14/0221; H04B 10/291; H04B 10/29; H04B 10/2918; H01S 3/0677; H01S 3/06766; H01S 3/1608
USPC ......... 398/79, 158, 159, 160, 173, 175, 176, 398/177, 34, 38, 92, 93, 94, 95, 33; 359/337, 341, 341.32, 41, 349, 341.42, 359/337.1
See application file for complete search history.

(56) References Cited

U.S. PATENT DOCUMENTS

| | | | |
|---|---|---|---|
| 6,049,418 A | 4/2000 | Srivastava et al. | |
| 6,882,466 B1 | 4/2005 | Shimojoh et al. | |
| 6,980,356 B2 * | 12/2005 | Lee | H01S 3/06758 359/341.41 |
| 7,167,302 B2 * | 1/2007 | Lee | H01S 3/094003 359/341.32 |
| 9,967,051 B2 * | 5/2018 | Zhang | H04B 10/616 |

(Continued)

FOREIGN PATENT DOCUMENTS

CN 1444084 A 9/2003

Primary Examiner — Hanh Phan
(74) Attorney, Agent, or Firm — Conley Rose, P.C.

(57) ABSTRACT

An optical amplification system includes: a first amplification module configured to amplify at least a conventional band (C band) optical signal; a second amplification module configured to amplify a longer wavelength band (L band) optical signal; an attenuator configured to attenuate at least the C band optical signal to obtain a first optical signal and a second optical signal, where the attenuator is further configured to output the first optical signal to the second amplification module and output the second optical signal to a wavelength division multiplexing module, which is configured to combine and output the C band optical signal and the L band optical signal.

20 Claims, 5 Drawing Sheets

(56) References Cited

U.S. PATENT DOCUMENTS

2002/0181091 A1 12/2002 Song et al.
2003/0169490 A1 9/2003 Hwang et al.
2004/0240045 A1 12/2004 Lee et al.
2017/0214484 A1 7/2017 Zhang et al.

* cited by examiner

OPTICAL AMPLIFICATION SYSTEM

CROSS-REFERENCE TO RELATED APPLICATIONS

This application is a continuation of International Patent Application No. PCT/CN2017/096743, filed on Aug. 10, 2017, the disclosure of which is hereby incorporated by reference in its entirety.

TECHNICAL FIELD

This application relates to the field of optical communications, and more specifically, to an optical amplification system.

BACKGROUND

As a wavelength division multiplexing network is widely applied, a system capacity is greatly improved. However, currently, improvement of spectral efficiency of a conventional band (C band) has reached a bottleneck, and therefore, a wavelength division multiplexing system begins extending to bands apart from the C band. A longer wavelength band (L band), due to low attenuation, becomes a first choice of an extended frequency band. Therefore, for an erbium doped fiber amplifier (EDFA) system including a C band and an L band (C+L band EDFA), the EDFA system needs to be re-designed to match broader amplification bandwidth.

Currently, a conventional C+L band EDFA adopts a manner in which a C band EDFA and an L band EDFA are connected in parallel. FIG. 1 shows an optical amplification system including a C band EDFA and an L band EDFA. As shown in FIG. 1, an input end and an output end each use a wavelength division multiplexer (WDM) for wavelength splitting and combining, and the C band EDFA and the L band EDFA that are connected in parallel respectively amplify a C band optical signal and an L band optical signal.

Due to parallel use of the C band EDFA and the L band EDFA, and relatively low pumping efficiency of the L band EDFA, a total pumping power demand of the C+L band EDFA is doubled or even more compared with that of a single C band EDFA. Consequently, power consumption of the EDFA is increased, and application costs of a WDM system are also increased.

Therefore, an optical amplification system is urgently needed to improve the pumping efficiency.

SUMMARY

This application provides an optical amplification system capable of effectively improving pumping efficiency.

According to a first aspect, an embodiment of this application provides an optical amplification system, including: a first amplification module configured to amplify at least a conventional band (C band) optical signal; a second amplification module configured to amplify a longer wavelength band (L band) optical signal; an attenuator configured to attenuate at least a part of the C band optical signal amplified by the first amplification module and transparently transmit the other part of the C band optical signal amplified by the first amplification module, to obtain a first optical signal and a second optical signal, and further configured to output the first optical signal to the second amplification module and output the second optical signal to a wavelength division multiplexing module, where the first optical signal is used to perform auxiliary pumping for the second amplification module, and the first optical signal is attenuated light of the C band optical signal amplified by the first amplification module; and the wavelength division multiplexing module, where the wavelength division multiplexing module is configured to combine the optical signal amplified and output by the first amplification module and the L band optical signal amplified and output by the second amplification module, and output a combined signal.

Therefore, in this embodiment of this application, using a useless C band optical signal attenuated by the attenuator as auxiliary pumping of the L band amplification module, a pumping energy demand is effectively reduced and pumping efficiency of the optical amplification system is increased without affecting overall performance of the system.

With reference to the first aspect, in a first possible implementation of the first aspect, the first amplification module and the second amplification module are connected in parallel, and the optical amplifier further includes: a third amplification module configured to amplify the C band optical signal, where the attenuator is configured to output the second optical signal amplified by the third amplification module to the wavelength division multiplexing module, and the first amplification module and the third amplification module are connected in series; and/or a fourth amplification module configured to amplify the L band optical signal, where the attenuator is configured to output the first optical signal amplified by the fourth amplification module to the wavelength division multiplexing module, and the second amplification module and the fourth amplification module are connected in series.

With reference to the first aspect and the foregoing implementation, in a second possible implementation of the first aspect, the first amplification module is further configured to amplify the L band optical signal, the first amplification module and the second amplification module are connected in series, the attenuator is further configured to attenuate the L band optical signal output by the first amplification module, and the optical amplifier further includes a fifth amplification module. The fifth amplification module is configured to amplify the C band optical signal, where the second optical signal in the optical signals output by the first amplification module is amplified by the fifth amplification module and is then output to the wavelength division multiplexing module, and the fifth amplification module and the second amplification module are connected in parallel.

With reference to the first aspect and the foregoing implementations, in a third possible implementation of the first aspect, there is a band-pass filter between the first amplification module and the second amplification module, and the band-pass filter is configured to at least filter out-of-band noise of the band-pass filter, where the out-of-band noise includes an L band optical signal.

Therefore, the band-pass filtering filters the out-of-band noise, especially L band noise (a C band amplifier may also produce L band noise). The band-pass filter is also capable of filtering some in-band noise signals in a C band. That is, in the optical amplification system in this embodiment of this application, noise performance of an amplifier configured to amplify an L band optical signal can be optimized by adding a filter.

With reference to the first aspect and the foregoing implementations, in a fourth possible implementation of the first aspect, the first amplification module is further configured to amplify the L band optical signal, where the first amplification module and the second amplification module are connected in series, and the optical amplifier further includes a sixth amplification module. The sixth amplification module is configured to amplify the C band optical signal, where the second optical signal in the optical signals output by the first amplification module is amplified by the sixth amplification module and is then output to the wavelength division multiplexing module, and the sixth amplification module and the second amplification module are connected in parallel.

With reference to the first aspect and the foregoing implementations, in a fifth possible implementation of the first aspect, there is a band-pass filter between the sixth amplification module and the second amplification module. The band-pass filter is configured to at least filter out-of-band noise of the band-pass filter, where the out-of-band noise includes an L band optical signal.

With reference to the first aspect and the foregoing implementations, in a sixth possible implementation of the first aspect, the first amplification module includes an erbium doped fiber amplifier (EDFA).

With reference to the first aspect and the foregoing implementations, in a seventh possible implementation of the first aspect, the attenuator includes at least one of the following: an optical splitter based on a variable transmissive/reflective film technology, an acousto-optic/electro-optic effect optical splitter, a variable fiber coupling length attenuator, a Mach Zehnder Interferometer, a micro-electro-mechanical system (MEMS), or a liquid crystal on silicon optical splitter.

Therefore, a ratio-adjustable optical splitter not only serves as an adjustable attenuator, but also implements a function of extracting a C band optical signal. By the entire system, the pumping efficiency of the entire C+L EDFA is improved while ensuring that the performance of the C band amplification module is not affected.

DESCRIPTION OF EMBODIMENTS

Figure 1:
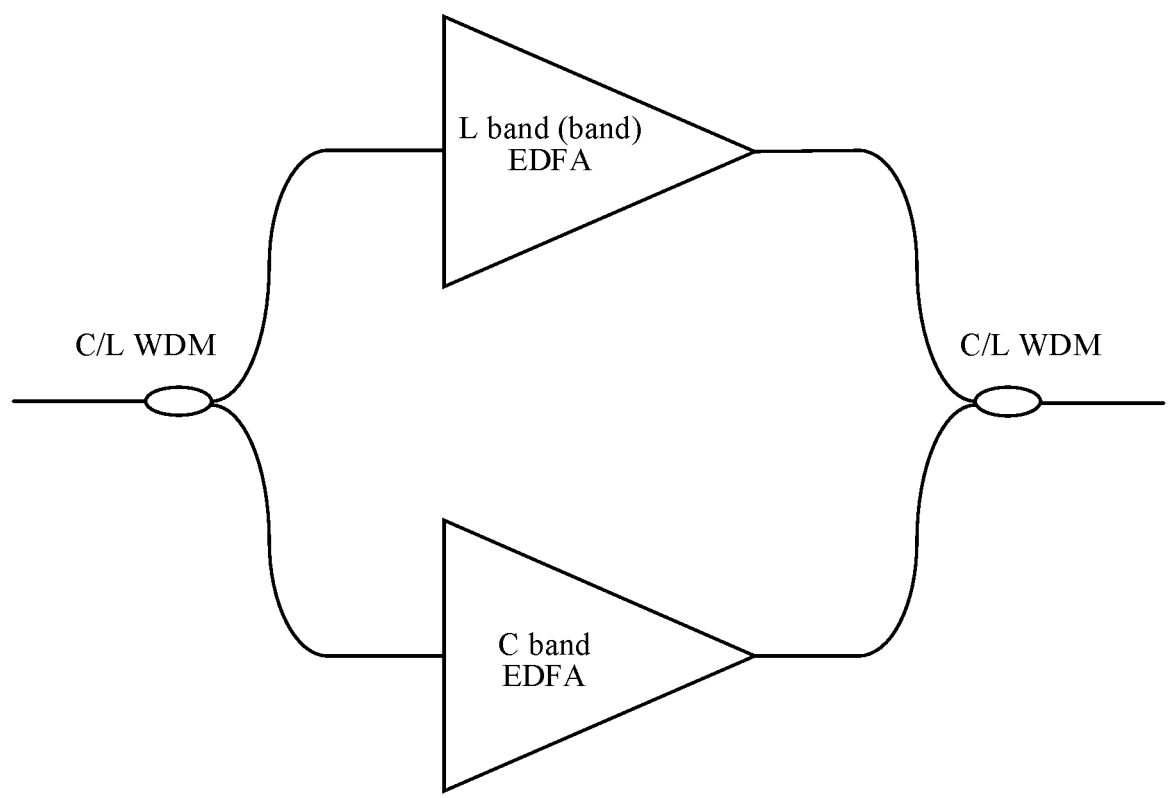
FIG. 1 is a schematic diagram of an optical amplification system.

The following describes the embodiments of this application with reference to the accompanying drawings.

An optical amplification system according to an embodiment of this application includes: a first amplification module, where the first amplification module is configured to amplify at least a C band optical signal; a second amplification module, where the second amplification module is configured to amplify an L band optical signal; an attenuator, where the attenuator is configured to attenuate at least C band optical signal amplified by the first amplification module to obtain a first optical signal and a second optical signal, and the attenuator is further configured to output the first optical signal to the second amplification module, and output the second optical signal to a wavelength division multiplexing module, where the first optical signal is attenuated light of the C band optical signal amplified by the first amplification module; and the wavelength division multiplexing module, where the wavelength division multiplexing module is configured to combine the optical signal amplified and output by the first amplification module and the L band optical signal amplified by the second amplification module, and output a combined signal.

It should be understood that, the first amplification module or the second amplification module includes at least an EDF, and may further include: a gain flattening filter (GFF), an isolator (ISO), a WDM, or the like.

Optionally, in an embodiment of this application, the attenuator may be an adjustable attenuator, and may be at least one of the following: an optical splitter based on a variable transmissive/reflective film technology, an acousto-optic/electro-optic effect optical splitter, a variable fiber coupling length attenuator, a Mach Zehnder Interferometer, a micro-electro-mechanical system (MEMS), or a liquid crystal on silicon (LCoS) optical splitter.

An inversion rate of erbium ions of an EDF differs at different pumping powers, and signal gain coefficient spectrum patterns corresponding to different inversion rates of ions are different. For example, when the inversion rate of erbium ions is approximately below 50%, the EDF demonstrates absorption of C band light and amplification of L band light. Therefore, the EDF amplifies an L band optical signal by absorbing a C band optical signal as a pumping source. Therefore, in an amplification system that simultaneously amplifies the C band optical signal and the L band optical signal (a C+L band amplification system), an L band optical signal can be amplified by extracting a C band optical signal in a C band amplification module (or a C+L amplification module), and then coupling the C band optical signal to an L band optical amplification module to perform auxiliary pumping for the L band amplification module.

Therefore, in this embodiment of this application, using a useless optical signal of a useless C band attenuated by the attenuator as auxiliary pumping of the L band amplification module, a pumping energy demand is effectively reduced and pumping efficiency of the optical amplification system is increased without affecting overall performance of the system.

Figure 2:
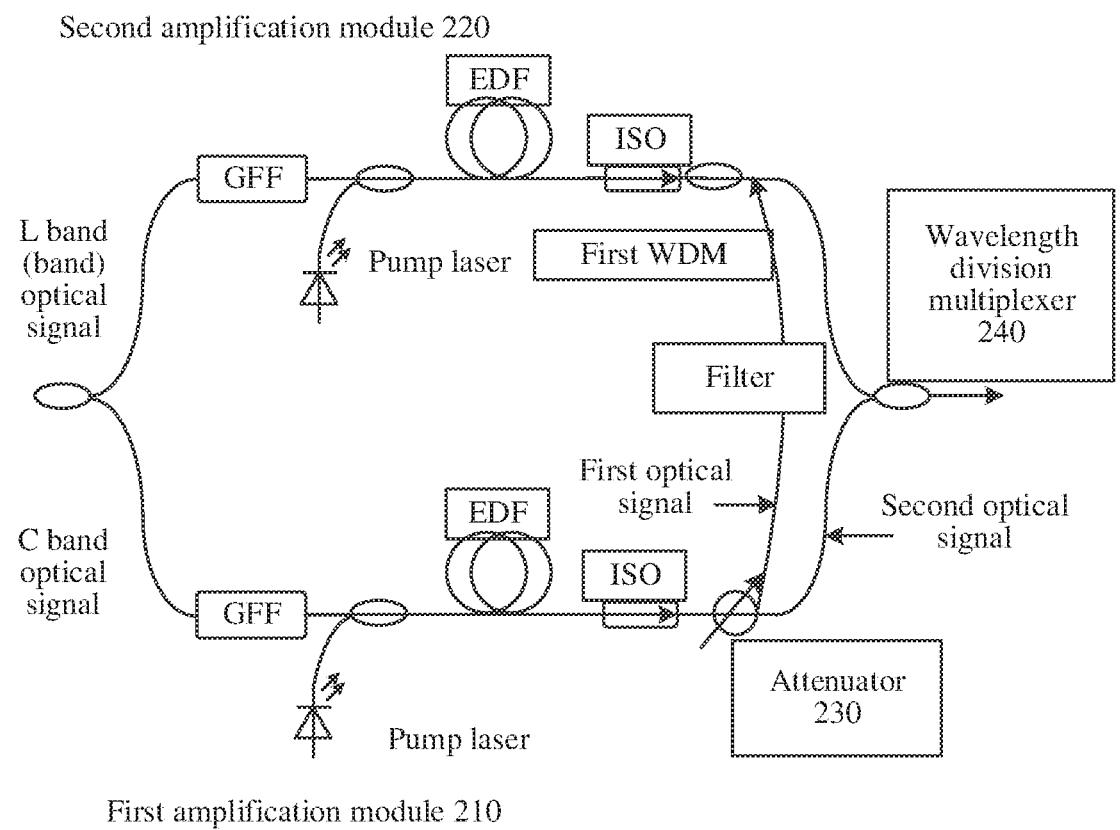
FIG. 2 is a schematic diagram of an amplification system according to an embodiment of this application.

FIG. 2 shows an amplification system according to an embodiment of this application. As shown in FIG. 2, the amplification system includes: a first amplification module, where the first amplification module is configured to amplify a C band optical signal; a second amplification module, where the second amplification module is configured to amplify an L band optical signal; an attenuator, where the attenuator is configured to attenuate a part of the C band optical signal amplified by the first amplification module and transparently transmit the other part of the C band optical signal amplified by the first amplification module, to obtain a first optical signal and a second optical signal. The attenuator is further configured to output the first optical signal to the second amplification module and output the second optical signal to a wavelength division multiplexing module, where the first optical signal is used to perform auxiliary pumping for the second amplification module, and the first optical signal is attenuated light of the C band optical signal amplified by the first amplification module; and the wavelength division multiplexing module, where the wavelength division multiplexing module is configured to combine the second optical signal amplified and output by the first amplification module and the L band optical signal amplified by the second amplification module, and output a combined signal.

The first amplification module further includes a gain flattening filter (GFF), an EDF, and an isolator (ISO).

Further, the figure further shows a pump laser configured to pump the first amplification module and a pump laser configured to pump the second amplification module.

The second amplification module further includes a GFF, an EDF, and an ISO. It should be understood that the first amplification module and the second amplification module may further include other photoelectric devices. This is not limited in this application.

It should also be understood that the wavelength division multiplexing module may be a WDM or another apparatus for wavelength division multiplexing. This is not limited in this application.

Optionally, in an embodiment of this application, the attenuator may be an adjustable attenuator, and may be at least one of the following: an optical splitter based on a variable transmissive/reflective film technology, an acousto-optic/electro-optic effect optical splitter, a variable fiber coupling length attenuator, a Mach Zehnder Interferometer, a micro-electro-mechanical system (MEMS), or a liquid crystal on silicon (LCoS) optical splitter.

Optionally, in an embodiment of this application, there is a band-pass filter between the first amplification module and the second amplification module. The band-pass filter is configured to at least filter out-of-band noise of the band-pass filter, where the out-of-band noise includes an L band optical signal.

For example, through the first amplification module and the attenuator, the obtained first optical signal is mainly a C band optical signal and the obtained second optical signal is mainly an L band optical signal. Therefore, the band-pass filter filters the out-of-band noise, especially L band noise (a C band amplifier may also produce L band noise). The band-pass filter is also capable of filtering some in-band noise signals in a C band. That is, in the optical amplification system in this embodiment of this application, noise performance of an amplifier configured to amplify an L band optical signal can be optimized by adding a filter.

The first optical signal passing through the filter performs auxiliary pumping for the second amplification module through a first WDM.

Therefore, in this embodiment of this application, using a useless optical signal of a useless C band attenuated by the attenuator as auxiliary pumping of the L band amplification module, a pumping energy demand is effectively reduced and pumping efficiency of the optical amplification system is increased without affecting overall performance of the system.

Optionally, in an embodiment of this application, the first amplification module and the second amplification module are connected in parallel, and the optical amplifier further includes: a third amplification module, where the third amplification module is configured to amplify the C band optical signal, where the attenuator is configured to output the second optical signal amplified by the third amplification module to the wavelength division multiplexing module, and the first amplification module and the third amplification module are connected in series; and/or a fourth amplification module, where the fourth amplification module is configured to amplify the L band optical signal, where the attenuator is configured to output the first optical signal amplified by the fourth amplification module to the wavelength division multiplexing module, and the second amplification module and the fourth amplification module are connected in series.

Figure 3:
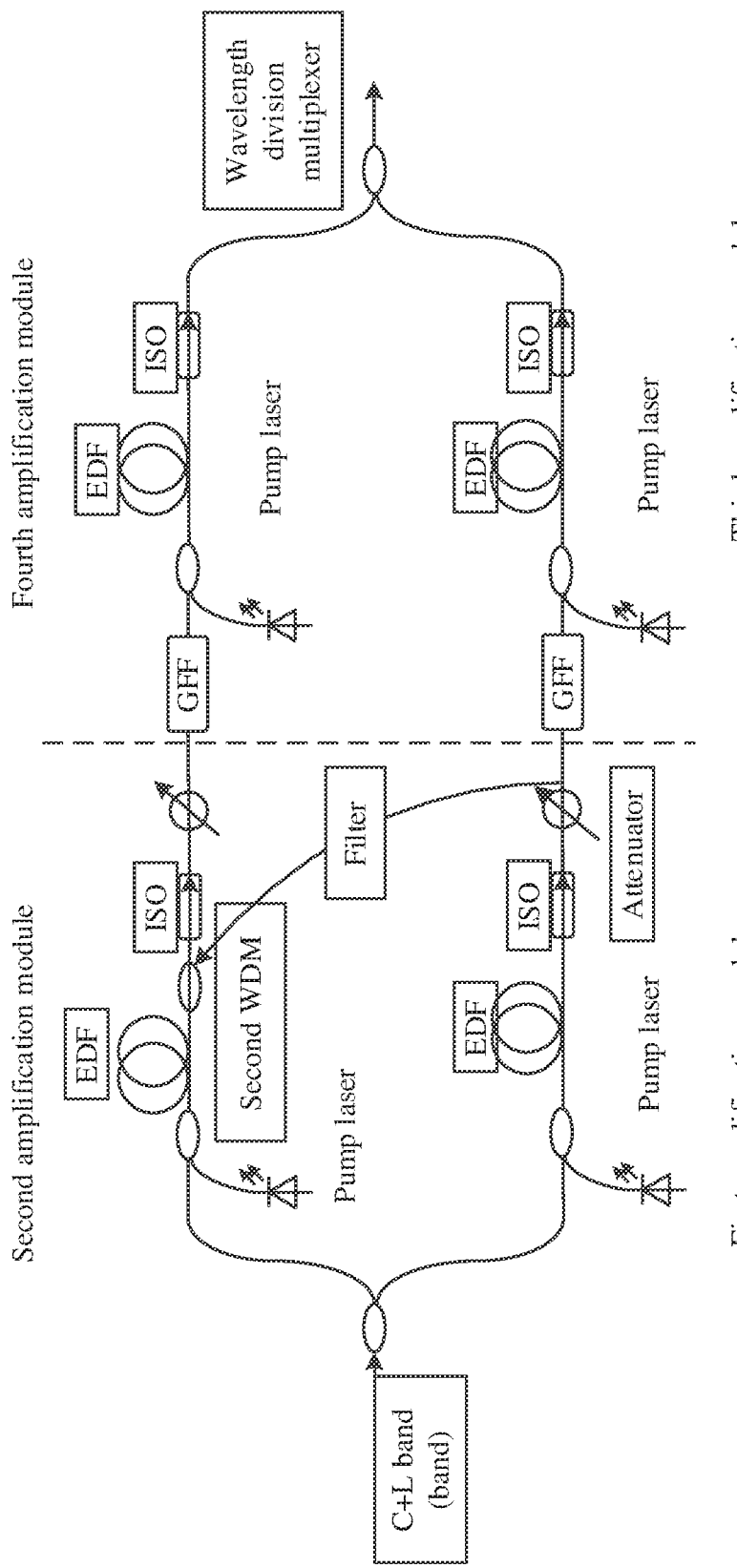
FIG. 3 is a schematic diagram of an amplification system according to an embodiment of this application.

FIG. 3 is a schematic diagram of an amplification system according to an embodiment of this application. As shown in FIG. 3, the system is a typical parallel C+L band amplifier structure, where an upper half is an L band amplification module including a second amplification module and a fourth amplification module, forming a two-stage cascaded structure; and a lower half is a C band amplification module including a first amplification module and a third amplification module, also forming a two-stage cascaded structure. Two amplification modules connected in parallel are both two-stage structures. An attenuator is disposed between EDFs of two stages, and a gain of an optical amplification module is changed by adjusting the attenuator. When input optical power increases and the amplification module needs to reduce the gain, an attenuation quantity of the attenuator needs to be increased.

For two output ports of the attenuator, a second optical signal output by one output port is output to the third amplification module, and a second output port is connected to the second amplification module (the second amplification module is configured to amplify an L band optical signal) and coupled to an optical path of the second amplification module through a second WDM. A C band filter may be added between the second output port and the second WDM to select and couple a part of the C band optical signal to the L band amplification module, to ensure that a noise coefficient of the L band amplification does not deteriorate.

For example, when the optical signal attenuation between the two stages of the C band amplification module needs to be increased, the attenuator is adjusted. For example, if the attenuator is a ratio-adjustable optical splitter, an optical split ratio of the ratio-adjustable optical splitter is adjusted by reducing an optical split ratio of an optical signal sent to the third amplification module and increasing an optical split ratio of an optical signal sent to the first amplification module.

Therefore, a ratio-adjustable optical splitter not only serves as an adjustable attenuator, but also implements a function of extracting a C band optical signal. By the entire system, the pumping efficiency of the entire C+L EDFA is improved while ensuring that the performance of the C band amplification module is not affected.

Optionally, in an embodiment of this application, there is a band-pass filter between the first amplification module and the second amplification module. The band-pass filter is configured to at least filter out-of-band noise of the band-pass filter, where the out-of-band noise includes an L band optical signal.

Optionally, in an embodiment of this application, the first amplification module is further configured to amplify the L band optical signal, the first amplification module and the second amplification module are connected in series, where the attenuator is further configured to attenuate the L band optical signal output by the first amplification module. Additionally, the optical amplifier further includes a fifth amplification module configured to amplify the C band optical signal, where the second optical signal in the optical signals output by the first amplification module is amplified by the fifth amplification module and is then output to the wavelength division multiplexing module, and the fifth amplification module and the second amplification module are connected in parallel.

Figure 4:
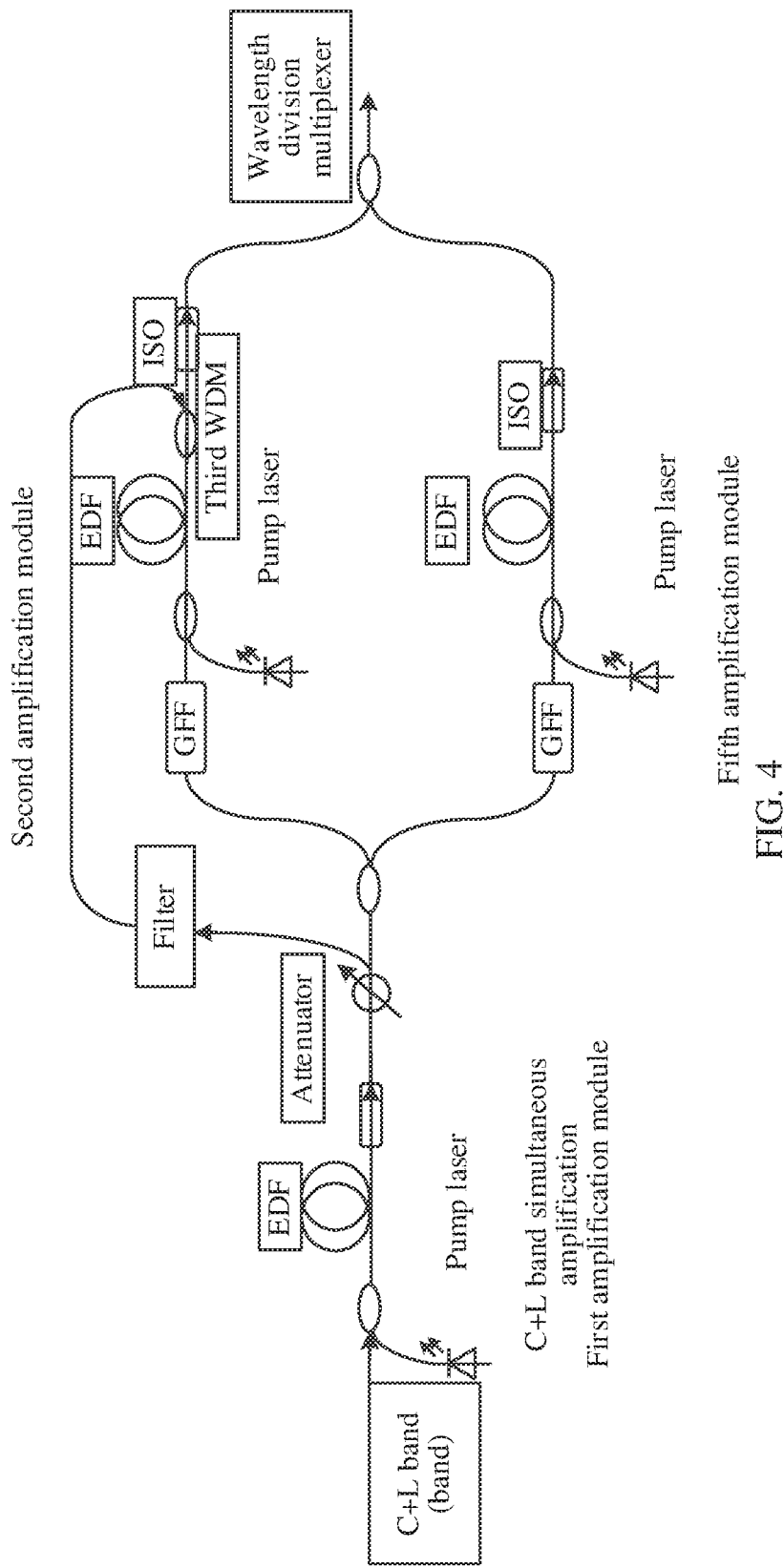
FIG. 4 is a schematic diagram of an amplification system according to an embodiment of this application.

FIG. 4 is a schematic diagram of an amplification system according to an embodiment of this application. As shown in FIG. 4, a first amplification module is a C+L amplification module, and an attenuator is configured to attenuate a C band optical signal and an L band optical signal output by the C+L amplification module. For example, if the attenuator is a ratio-adjustable optical splitter, the attenuator may couple a split part of C band light (such as the foregoing first optical signal) to a second amplification module through a third WMD to perform auxiliary pumping for the second amplification module. The other part of C band light (such as the foregoing second optical signal) output by the attenuator may be output to a fifth amplification module for amplifying. The C band optical signal amplified by the fifth amplification module and the L band optical signal amplified by the second amplification module are combined and output through a WMD.

Optionally, between the ratio-adjustable optical splitter and the WMD, a band-pass filter needs to be added, through which only the C band optical signal or a part of the C band optical signal can pass.

Further, an optical split ratio of an optical signal at a port connected to the band-pass filter can be adjusted by adjusting an optical split ratio of the ratio-adjustable optical splitter. That is, a ratio of the C+L band optical signal output by the first amplification module is adjusted.

Therefore, in this embodiment of this application, using an attenuated useless optical signal of the C band as auxiliary pumping of the L band amplification module, a pumping energy demand is effectively reduced, and pumping efficiency of the optical amplification system is increased without affecting overall performance of the system.

Optionally, in an embodiment of this application, the first amplification module includes an erbium doped fiber amplifier (EDFA).

Optionally, in an embodiment of this application, the first amplification module is further configured to amplify the L band optical signal, the first amplification module and the second amplification module are connected in series, and the optical amplifier further includes a sixth amplification module. The sixth amplification module is configured to amplify the C band optical signal, where the second optical signal in the optical signals output by the first amplification module is amplified by the sixth amplification module and is then output to the wavelength division multiplexing module, and the fifth amplification module and the second amplification module are connected in parallel.

Figure 5:
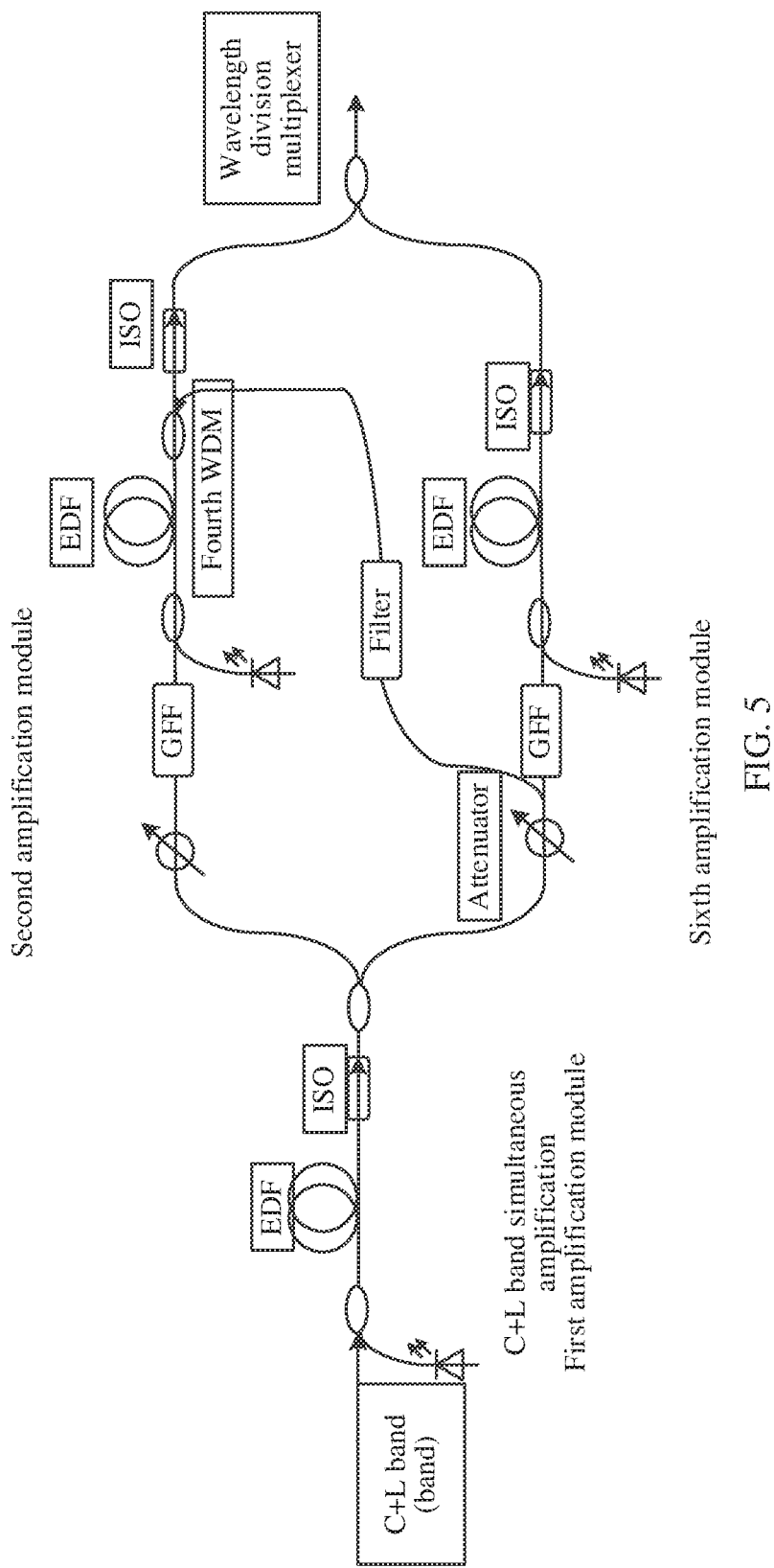
FIG. 5 is a schematic diagram of an amplification system according to an embodiment of this application.

FIG. 5 is a schematic diagram of an optical amplification system according to an embodiment of this application. As shown in FIG. 5, a first amplification module is a C+L amplification module. For light of the C+L amplifier after being split, an attenuator is configured to attenuate a C band optical signal output by the C+L amplification module. For example, if the attenuator is a ratio-adjustable optical splitter, the attenuator may couple a split part of C band light (such as the foregoing first optical signal) to a second amplification module through a fourth WMD to perform auxiliary pumping for the second amplification module. The other part of L band light output by the attenuator (such as the foregoing second optical signal) may be output to a sixth amplification module for amplifying. The C band optical signal amplified by the fifth amplification module and the L band optical signal amplified by the second amplification module are combined and output through a WMD.

Optionally, between the ratio-adjustable optical splitter and the WMD, a band-pass filter needs to be added, through which only the C band optical signal or a part of the C band optical signal can pass.

Further, an optical split ratio of an optical signal at a port connected to the band-pass filter can be adjusted by adjusting an optical split ratio of the ratio-adjustable optical splitter. That is, a ratio of the C band optical signals output by the sixth amplification module is adjusted.

Therefore, in this embodiment of this application, using an attenuated useless optical signal of the C band as auxiliary pumping of the L band amplification module, a pumping energy demand is effectively reduced, and pumping efficiency of the optical amplification system is increased without affecting overall performance of the system.

Optionally, as an embodiment of this application, the first amplification module includes an erbium doped fiber amplifier (EDFA).

Therefore, in this embodiment of this application, using an attenuated useless optical signal of the C band as auxiliary pumping of the L band amplification module, a pumping energy demand is effectively reduced, and pumping efficiency of the optical amplification system is increased without affecting overall performance of the system.

What is claimed is:

1. An optical amplification system, comprising:
    a first amplifier configured to amplify a conventional band (C band) optical signal;
    a second amplifier configured to amplify a longer wavelength band (L band) optical signal;
    an attenuator configured to:
        attenuate at least a first part of the C band optical signal;
        transparently transmit a second part of the C band optical signal to obtain a first optical signal and a second optical signal, wherein the first optical signal is attenuated light of the C band optical signal, and wherein the second optical signal is the second part;
        output the first optical signal to the second amplifier; and
        output the second optical signal, wherein the first optical signal is for performing auxiliary pumping of the second amplifier; and
    a wavelength division multiplexer configured to:
        receive the second optical signal from the attenuator;
        combine the C band optical signal and the L band optical signal; and
        output a combined signal.

2. The optical amplification system according to claim 1, wherein the first amplifier and the second amplifier are connected in parallel.

3. The optical amplification system according to claim 2, further comprising a third amplifier configured to amplify the C band optical signal.

4. The optical amplification system according to claim 3, wherein the attenuator is configured to output the second optical signal to the wavelength division multiplexer.

5. The optical amplification system according to claim 4, wherein the first amplifier and the third amplifier are connected in series.

6. The optical amplification system according to claim 3, further comprising a fourth amplifier configured to amplify the L band optical signal.

7. The optical amplification system according to claim 6, wherein the attenuator is configured to pump the L band optical signal of the second amplifier using the first optical signal to obtain a third optical signal.

8. The optical amplification system according to claim 7, wherein the fourth amplifier is configured to:
    amplify the third optical signal; and
    output the third optical signal to the wavelength division multiplexer.

9. The optical amplification system according to claim 8, wherein the second amplifier and the fourth amplifier are connected in series.

10. The optical amplification system according to claim 9, wherein the first amplifier and the second amplifier are connected in series.

11. The optical amplification system according to claim 10, wherein the attenuator is further configured to attenuate the L band optical signal output by the first amplifier.

12. The optical amplification system according to claim 11, further comprising a fifth amplifier configured to amplify the C band optical signal.

13. The optical amplification system according to claim 12, wherein the fifth amplifier is configured to:
   amplify the second optical signal; and
   output the second optical signal to the wavelength division multiplexer.

14. The optical amplification system according to claim 13, wherein the fifth amplifier and the second amplifier are connected in parallel.

15. The optical amplification system according to claim 1, wherein the first amplifier is further configured to amplify the L band optical signal.

16. The optical amplification system according to claim 1, further comprising a band-pass filter between the first amplifier and the second amplifier, wherein the band-pass filter is configured to at least filter out-of-band noise of the band-pass filter, and wherein the out-of-band noise comprises an L band optical signal.

17. The optical amplification system according to claim 1, wherein the first amplifier is further configured to amplify the L band optical signal, wherein the first amplifier and the second amplifier are connected in series, wherein the optical amplification system further comprises a sixth amplifier configured to amplify the C band optical signal, wherein the second optical signal is amplified by the sixth amplifier and is then output to the wavelength division multiplexer, and wherein the sixth amplifier and the second amplifier are connected in parallel.

18. The optical amplification system according to claim 17, further comprising a band-pass filter between the sixth amplifier and the second amplifier, wherein the band-pass filter is configured to at least filter out-of-band noise of the band-pass filter, and wherein the out-of-band noise comprises an L band optical signal.

19. The optical amplification system according to claim 1, wherein the first amplifier comprises an erbium-doped fiber amplifier (EDFA).

20. The optical amplification system according to claim 1, wherein the attenuator comprises at least one of: an optical splitter based on a variable transmissive/reflective film technology, an acousto-optic/electro-optic effect optical splitter, a variable fiber coupling length attenuator, a Mach Zehnder Interferometer, a micro-electro-mechanical system (MEMS), or a liquid crystal on silicon optical splitter.

* * * * *